(No Model.)
A. M. AMOS.
STEAM COFFEE POT.
No. 353,280. Patented Nov. 30, 1886.
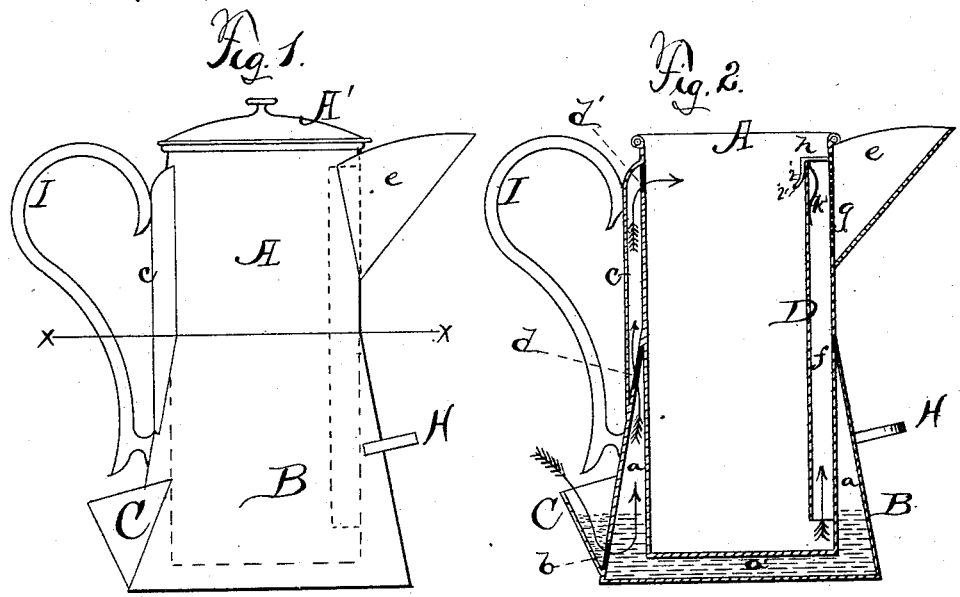
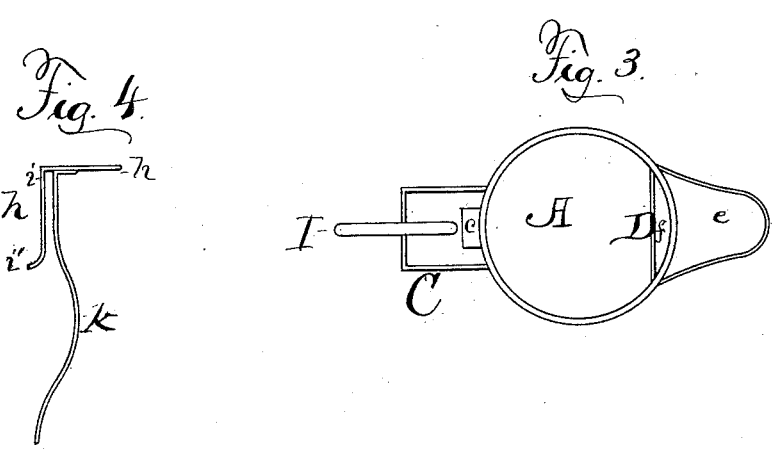
Witnesses:
T. H. Parsons.
J. R. Drake.
Alexander M. Amos,
INVENTOR,
by J. R. Drake, Atty.

United States Patent Office.

ALEXANDER M. AMOS, OF BUFFALO, NEW YORK.

STEAM COFFEE-POT.

SPECIFICATION forming part of Letters Patent No. 353,280, dated November 30, 1886.

Application filed October 23, 1885. Serial No. 180,721. (No model.)

*To all whom it may concern:*

Be it known that I, ALEXANDER M. AMOS, a citizen of the United States, residing at Buffalo, in the county of Erie and State of New York, have invented certain new and useful Improvements in Steam Coffee-Pots; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to cook coffee by steam generated in the vessel and to keep all the aroma therein while cooking, and at the same time so construct it that it can be thoroughly cleaned after use, all as hereinafter fully explained.

In the drawings, Figure 1 is a side elevation; Fig. 2, an elevation in vertical cross-section, showing entire inside construction; Fig. 3, a top plan of pot without cover; and Fig. 4, a detail, being a side elevation of spring-cover.

A represents a cylindrical coffee-pot, and B an outside case or jacket, extending from about line $x\ x$, Fig. 1, and, flaring outward to the bottom, makes a permanent bottom to the whole pot. This gives a space, $a$, between pot A and case B all around, and space $a'$ between the bottom of pot A and the permanent bottom. (See Fig. 2.)

C is a flaring-mouthed spout attached to the outside of case B near the bottom. A small opening, $b$, at bottom, made in the case B, leads into the steam-space $a\ a'$. Into this the water is poured to about the height shown in Fig. 2, and this, when set on a stove, generates the steam.

Attached to the outside of case A, and partly on case B, is an inclosed tube, $c$, (see Figs. 1 and 2,) having an opening, $d$, in case B near the middle of the pot, and leading from the steam-space $a$. Near the top of this tube is another small opening, $d'$, leading into the coffee-pot proper, A. The steam generated in space $a\ a'$ rises through this tube and into pot A through the openings $d\ d'$.

D is a partition-plate (see Figs. 2 and 3) attached inside the pot A across and a short distance from the spout-opening $e$, leaving a vertical passage, $f$, as shown, which extends from near the top of the coffee-pot to within a short distance of the bottom, and is open at bottom and top. The coffee, entering at the bottom, pours out at spout-opening $e$, in which is set a permanent strainer, $g$.

On the top of passage $f$ is set a small spring-cover, $h$, which keeps the steam and aroma from escaping through the strainer $g$. It is removable, so as to allow cleaning out the passage $f$ and strainer $g$. If it were permanent, these would become clogged and rusted.

The cover has a flat top, the front edge fitting closely the curve of the pot. It is bent at $i$ and curved at $i'$, so as to press against the partition D on one side, and a spring-tongue, $k$, attached to the under side of the top, projects downward, and is curved, as shown, to press against the inside of partition D and force the cover against the inside of the pot A, so as to make a tight fit. This keeps passage $f$ closed at the top while the coffee is being cooked or poured out.

H is a front handle, which, in connection with the usual handle, I, is to lift the pot and pour out at C the water in space $a\ a'$.

The handle I does not project above the top of the pot, which allows the pot to set evenly upside down to get all the water and moisture out, so as to prevent rusting, the spring-cover $h$ being removed at same time.

The operation is effective and simple. Water, preferably hot, is poured into spout C, filling space $a$ up to about as shown in Fig. 2, coffee having first been put in the pot A and also boiling water. It is then set on the fire. The steam generated in space $a\ a'$ rises through opening $d$ into tube $c$, and flows through opening $d'$ into pot A, keeping the water therein at boiling-point. By this simple arrangement all the steam that escapes is merely that from steam-space $a$, and not from the pot A, containing the coffee. Therefore there is little or no waste of the aroma, and therefore the best part of the coffee is retained.

I claim—

1. The vessel A, provided with the spout, and the partition D, forming a passage, $f$, communicating with said spout, substantially as set forth.

2. The combination, with the vessel A, provided with the spout, and the partition D, forming the passage $f$, of the removable cover fitting the upper end of said passage, substantially as set forth.

3. The combination, with the vessel A, provided with the spout, and partition D, forming the passage $f$, of the cover $h$, comprising a flat top, bent as at $i$, and the spring-tongue $k$, substantially as set forth.

4. The combination, with vessel A, of the case inclosing its lower end and secured to its sides at its upper end, leaving a space between the two, the flaring spout C, the said inclosed case having an opening communicating with said spout, the tube $c$, secured to the side of the vessel A, and case B, said case having the opening $d$ and the pot the opening $d'$, both of said openings communicating with the interior of the tube, as set forth.

In testimony whereof I affix my signature in presence of two witnesses.

ALEXANDER M. AMOS.

Witnesses:
T. H. PARSONS,
J. R. DRAKE.